Oct. 18, 1932.  B. A. REXFORD  1,882,907
SLED
Filed Jan. 31, 1931  2 Sheets-Sheet 2
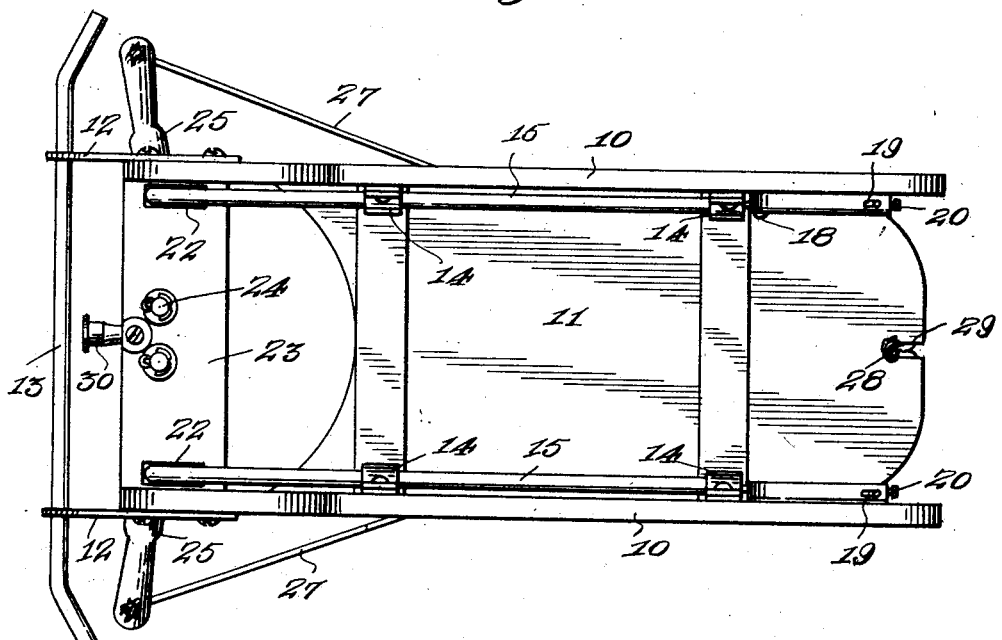
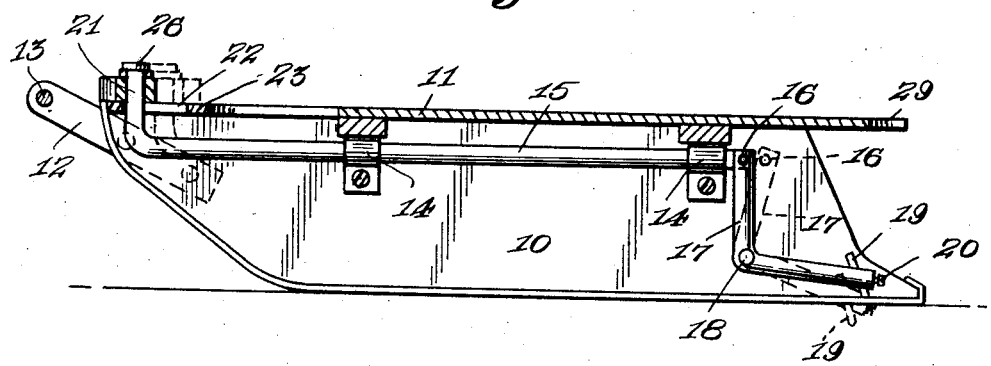
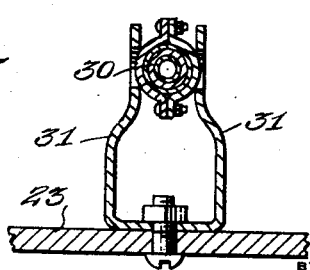

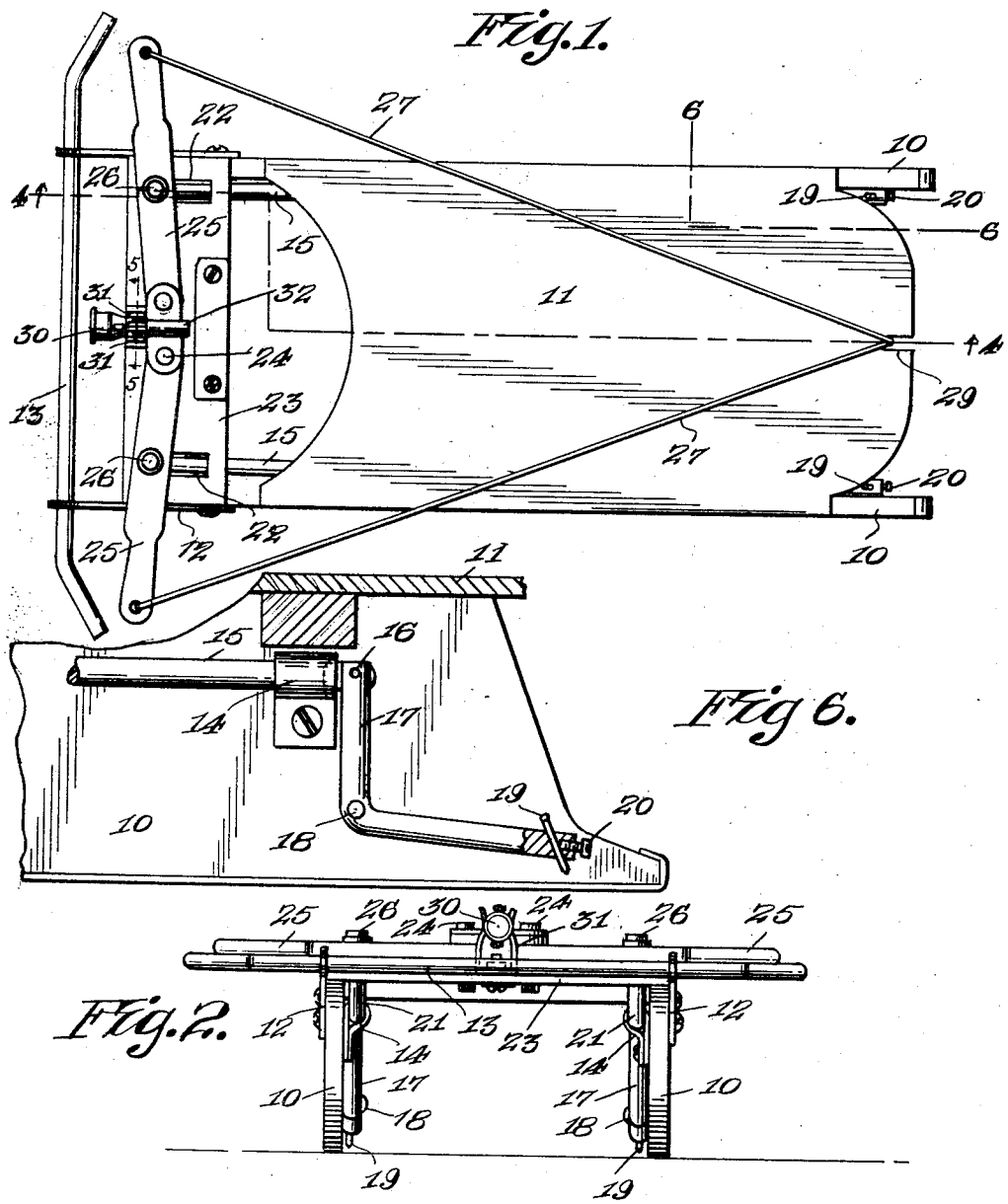

Patented Oct. 18, 1932

1,882,907

UNITED STATES PATENT OFFICE

BENJAMIN A. REXFORD, OF ALTON, ILLINOIS

SLED

Application filed January 31, 1931. Serial No. 512,711.

This invention relates to sleds and has for an object the provision of means which may be attached to a sled to steer the same either to the right or left, and which also may be used as a brake to reduce the speed of the sled or to bring the sled to a stop.

Another object of the invention is the provision of means as above set forth which are simple in construction, reliable and efficient in use, and which may be readily installed.

With the above and other objects in view, the invention further includes the following novel features and details of construction, to be hereinafter more fully described, illustrated in the accompanying drawings and pointed out in the appended claim.

In the drawings:—

Figure 1 is a top plan view of a sled constructed in accordance with the invention.

Figure 2 is a front view.

Figure 3 is a bottom plan view.

Figure 4 is a section on the line 4—4 of Figure 1.

Figure 5 is an enlarged fragmentary section on the line 5—5 of Figure 1.

Figure 6 is an enlarged fragmentary section taken substantially on the line 6—6 of Figure 1.

Referring to the drawings in detail wherein like characters of reference denote corresponding parts, the reference character 10 indicates the runners of the sled which may be of any suitable construction, while the top of the sled is indicated at 11. The runners 10 may have extending from their forward ends, arms 12 which support a bumper bar 13.

Mounted for longitudinal sliding movement in bearings 14 which are secured to the inner face of the runners 10 are longitudinally slidable rods 15. The rear ends of these rods are pivotally connected as shown at 16 to the upper ends of angle arms 17, the latter being pivotally mounted as shown at 18. The rear ends of these arms 17 carry ground engaging elements or pins 19 and these pins are removably and adjustably held in position by means of set screws 20 which enter the rear lower ends of the arms. The forward ends of the rods 15 are provided with upwardly extending angular extremities 21 which are movable in elongated slots 22 provided in the top 11, or in a cross member 23 in advance of the top. In other words, the top 11 may extend forward a sufficient distance so that the slots 22 may be formed therein, or the member 23 may be added as an attachment to the sled.

Pivotally mounted upon the member 23 as shown at 24 are oppositely and outwardly extending hand levers 25 and the angular extremities 21 of the rods 15 are pivotally secured to these levers 25 as shown at 26.

As thus far described, it will be apparent that by pulling the outward ends of the levers 25 rearward, the rods 15 may be moved rearward so as to cause the ground engaging elements 19 to extend below the bottoms of the runners 10 and engage the ground as shown by the dotted lines in Figure 4 of the drawings. Simultaneous operation of both of the hand levers 25 will act as a brake for the sled while the operation of only one lever will act to steer the sled. For example, operation of the right hand lever 25 will cause the ground engaging element 19 controlled thereby to engage the ground and cause the sled to turn to the right while operation of the other lever 25 will cause a left hand turn.

The levers may have secured thereto a rope 27 which may be used to pull the sled, the rope being attached to the outer ends of the arms 25 so as to pull these ends forward and maintain the ground engaging elements in raised position. When not in use as a tow rope, the knotted end 28 of this rope may be arranged within a notch 29 provided in the rear edge of the top of the sled so that the rope will be out of the way.

If desired, a headlight 30 may be movably mounted upon the member 23 at the forward end of the sled between bracket arms 31, and this lamp may be provided with a handle or grip 32 whreby the lamp may be manipulated. As the lamp has a universal movement between the bracket arms 31, the rays of the lamp may be projected in any direction.

The invention is susceptible of various changes in its form, proportions and minor details of construction and the right is herein reserved to make such changes as properly fall within the scope of the appended claim.

Having described the invention what is claimed is:—

In a sled, a top, runners, rods mounted for sliding movement longitudinally of the runners, angle arms pivotally mounted upon the runners and having one of their ends pivotally secured to the rear ends of the rods, ground engaging elements at the rear ends of the angle arms, upwardly disposed angular extremities extending through the top of the sled at the front end thereof, oppositely extending hand levers pivotally mounted upon the top of the sled, and means to pivotally secure the angular extremities of the rods to the hand levers.

In testimony whereof I affix my signature.

BENJAMIN A. REXFORD.